United States Patent
Lee

(10) Patent No.: US 7,612,596 B2
(45) Date of Patent: Nov. 3, 2009

(54) INTERNAL CLOCK GENERATOR

(75) Inventor: Geun Il Lee, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 48 days.

(21) Appl. No.: 11/747,993

(22) Filed: May 14, 2007

(65) Prior Publication Data

US 2007/0210850 A1    Sep. 13, 2007

Related U.S. Application Data

(63) Continuation-in-part of application No. 11/158,456, filed on Jun. 22, 2005, now abandoned.

(30) Foreign Application Priority Data

Apr. 27, 2005    (KR)    ........................ 10-2005-0034974

(51) Int. Cl.
    *G06F 1/04*    (2006.01)
(52) U.S. Cl. ........................ 327/291; 327/295
(58) Field of Classification Search .......... None
    See application file for complete search history.

(56) References Cited

U.S. PATENT DOCUMENTS

| 6,909,312 | B2 * | 6/2005 | Mitsumoto | 327/141 |
| 7,012,455 | B2 * | 3/2006 | Chen | 327/115 |
| 7,106,118 | B2 * | 9/2006 | Tang et al. | 327/291 |

* cited by examiner

*Primary Examiner*—Cassandra Cox
(74) *Attorney, Agent, or Firm*—Ladas & Parry LLP

(57) ABSTRACT

An internal clock generator that modulates a high-frequency clock signal to a low-frequency signal to transmit the low-frequency signal if a transmission line for transmitting the high-frequency clock signal is long, and then restores the transmitted low-frequency signal to the high-frequency signal. The internal clock generator includes a first signal generation unit for receiving a first signal having a first frequency and generating a second signal having a second frequency that is lower than the first frequency, and a second signal generation unit for receiving the second signal and generating a third signal having a frequency equal to the first frequency. Here, the third signal is used as a signal for controlling an operating time point of an internal circuit of a synchronous memory device.

11 Claims, 3 Drawing Sheets

INTERNAL CLOCK GENERATOR

The present application is a Continuation-in-Part of U.S. Ser. No. 11/158,456 filed Jun. 22, 2005.

BACKGROUND OF THE INVENTION

1. Field of the invention

The present invention relates to an internal clock generator used in a high-speed semiconductor device.

2. Description of the Prior Art

Generally, a synchronous semiconductor device controls an internal operation of the semiconductor device using an internal clock that is synchronized with an external clock. A representative synchronous semiconductor device may be a synchronous memory device (hereinafter referred to as a memory device) such as an SDRAM, DDR, SDRAM, etc.

Recently, with the development of technology, the operating frequency of a memory device is greatly being heightened and the size of the memory device is gradually increasing as well. Typically, the fact that the operating frequency of the memory device is increasing means that the frequency of the internal clock is also being heightened. Here, as a moving distance (i.e., transmission distance) of the internal clock is increasing, an RC loading of a transmission line is also increasing. However, in the case in which the loading of the transmission line is increasing, a problem may occur in transmitting a high-frequency signal.

Hereinafter, the conventional method of transmitting an internal clock will be explained with reference to the accompanying drawings.

FIG. 1 is a block diagram of a general memory device that uses the internal clock.

Referring to FIG. 1, a clock buffer 101 receives an external clock signal of an SSTL level or a TTL level. A clock generator 102 receives an output signal of the clock buffer 101, and generates an internal clock ICLK.

The internal clock ICLK is applied to a column control unit 11, a row control unit 12, a command control unit 13, a data control unit 14, etc., in the memory device, and controls the operating timing of the memory device. Here, the column control device 11 is a circuit for controlling a column operation of the memory device, and the row control unit 12 is a circuit for controlling a row operation of the memory device. Also, the command control unit 13 is a circuit for controlling a command such as an active, read, write, precharge, etc., and the data control unit 14 is an input/output (I/O) unit of the memory device.

FIG. 2 is a view illustrating an example of a conventional clock generator 102 used in the memory device of FIG. 1.

As illustrated in FIG. 2, a clock generator causes no trouble in the case in which a period of an input signal IN is longer than a delay time of a delay unit 21.

However, if the period of the input signal IN is shorter than the delay time of the delay unit 21, the memory device may malfunction. Specifically, if the input signal IN is a high-frequency signal over 500 MHz, it is difficult to apply such a clock generator to a high-speed memory device.

Additionally, in the case in which a signal transmission line is long, this may cause a problem in that the loading of the transmission line becomes extremely great and thus the high-frequency signal is not properly transferred.

SUMMARY OF THE INVENTION

Accordingly, the present invention has been made to solve the above-mentioned problems occurring in the prior art, and an object of the present invention is to provide an internal clock generator that modulates a high-frequency clock signal to a low-frequency signal to transmit the low-frequency signal if a transmission line for transmitting the high-frequency clock signal is long, and then restores the transmitted low-frequency signal to the high-frequency signal.

In a first embodiment of the present invention, there is provided an internal clock generator comprising a first signal generation unit for receiving a first signal having a first frequency and generating a second signal having a second frequency that is lower than the first frequency, and a second signal generation unit for receiving the second signal and generating a third signal having a frequency equal to the first frequency.

Here, the third signal is used as a signal for controlling an operating time point of an internal circuit of a synchronous memory device.

In a second embodiment of the present invention, there is provided an internal clock generator comprising a frequency modulation unit for receiving a first clock signal having a first frequency and outputting second and third clock signal having a second frequency, and a clock generation unit for receiving the second and third clock signals and outputting a fourth clock signal having the first frequency.

Here, if the first frequency is fo, the second frequency becomes fo/2.

Additionally, a rising edge of the second clock signal is in synchronization with a rising edge of the first clock signal, and a rising edge of the third clock signal is in synchronization with a falling edge of the first clock signal.

It is preferable that a high-level period of the second and third clock signals is equal to a period of the first clock signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
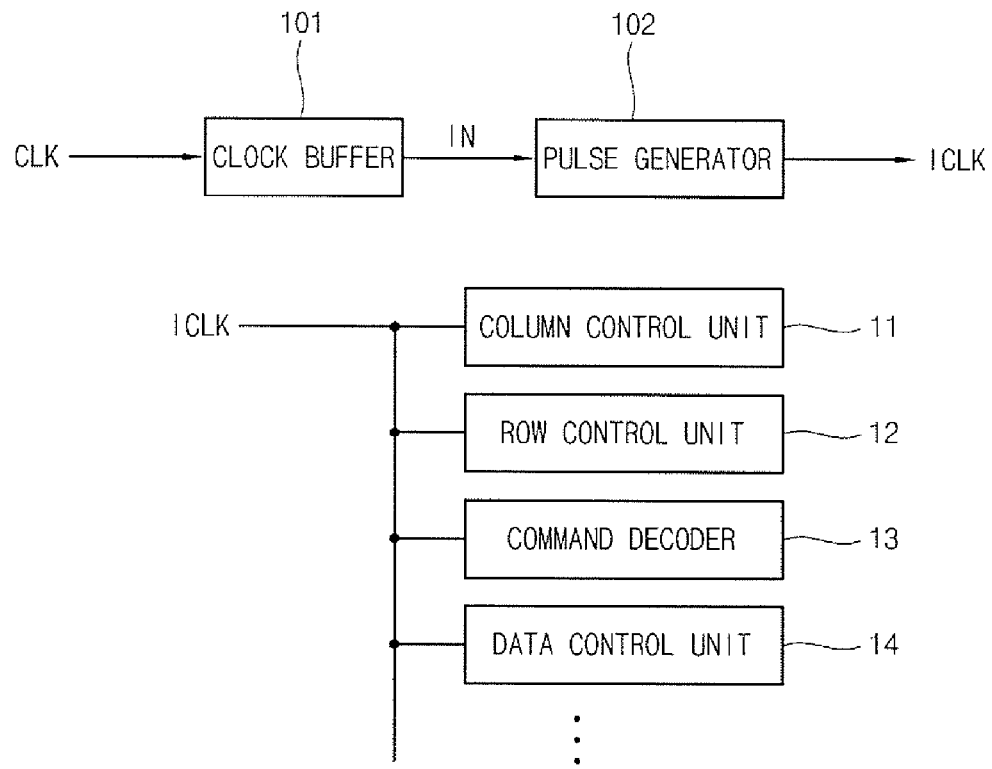
FIG. 1 is a block diagram of a general memory device that uses the internal clock.
Figure 2:
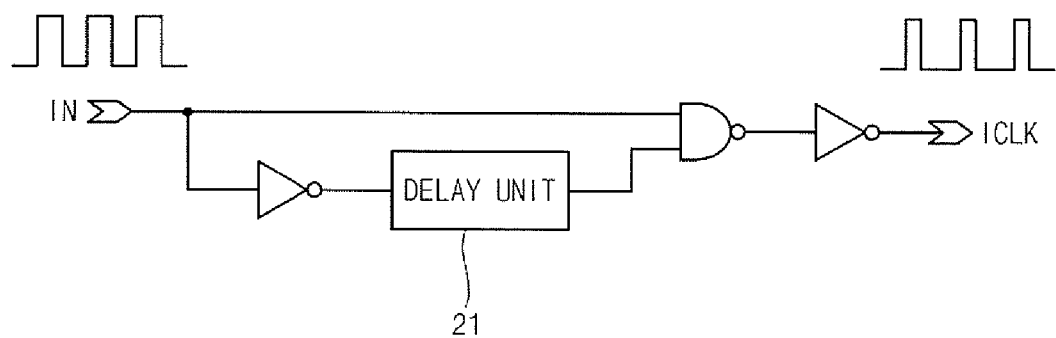
FIG. 2 is an exemplary circuit diagram of a conventional clock generator 102 used in the memory device of FIG. 1.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 3:
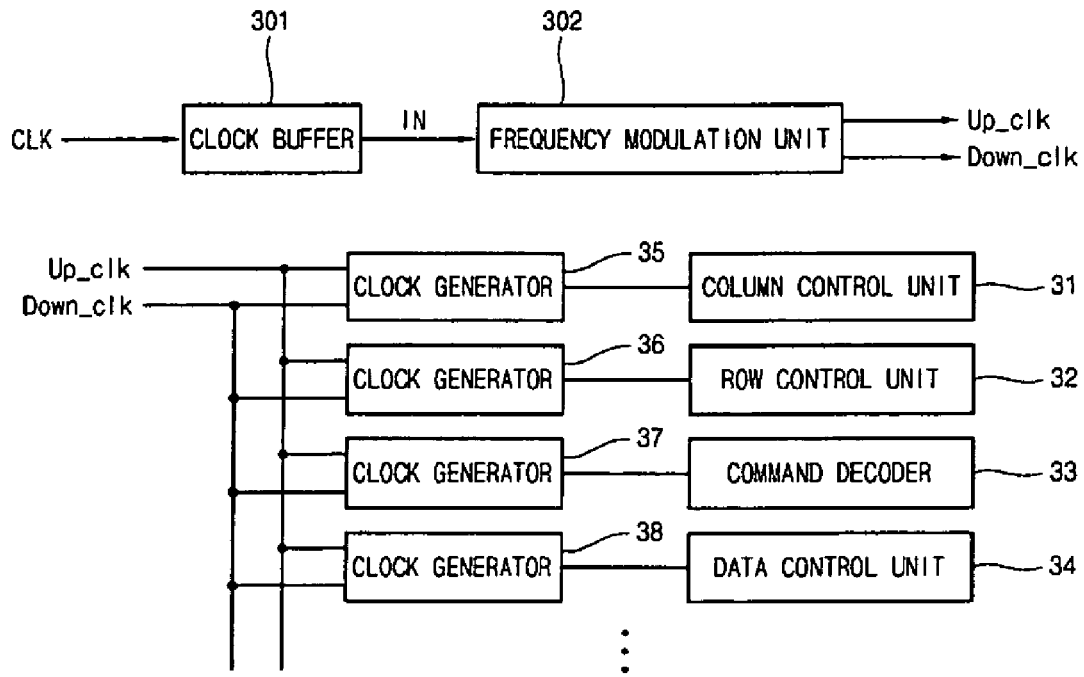
FIG. 3 is a block diagram of an internal clock generator according to an embodiment of the present invention.

FIG. 3 is a block diagram of an internal clock generator according to an embodiment of the present invention.

In FIG. 3, the construction and operation of a clock buffer 301 that receives an external clock signal CLK are the same as those of the conventional clock buffer. For example, the clock buffer 301 is the same as the clock buffer 101 explained with reference to FIG. 1. Also, the period of a clock signal IN output from the clock buffer 301 is the same as that of the external clock signal CLK (See FIG. 6).

A frequency modulation unit 302 modulates the frequency of the clock signal IN output from the clock buffer 301. In an embodiment of the present invention, the frequency of output signals Up_clk and Down_clk of the frequency modulation unit 302 is a ½ of the frequency of the clock signal IN. That is, the frequency modulation unit 302 of FIG. 3 performs the same function as a frequency divider. Here, the clock signal Up_clk rises in synchronization with a rising edge of the clock signal IN, and falls in synchronization with a rising edge of the next clock signal IN (See FIG. 6). Additionally, the clock signal Down_clk rises in synchronization with a falling edge of the clock signal IN, and falls in synchronization with a falling edge of the next clock signal IN (See FIG. 6).

Clock generation units 35 to 38 receive in common the output signals Up_clk and Down_clk of the frequency modulation unit 302, and output an internal clock signal ICLK. The clock generation units 35 to 38 correspond to a column control unit 31, a row control unit 32, a command decoder 33 and a data control unit 34 etc. in a one-to-one manner because there are differences in distance from frequency unit(differences in operating time points) among the column control unit 31, row control unit 32, command decoder 33 and data control unit 34 etc.

The clock generation units 35 to 38 that have received the clock signals Up_clk and Down_clk combine the clock signals and generate the internal clock signal ICLK having the same frequency as the clock signal IN.

The frequency modulation unit and the clock generation units as described above are constituent elements of the internal clock generator newly proposed in one embodiment of the present invention.

Figure 4:
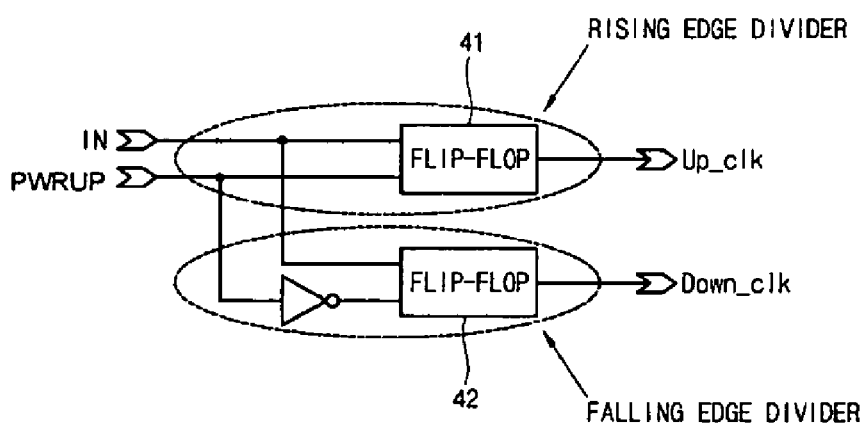
FIG. 4 is an exemplary circuit diagram of a frequency modulator as illustrated in FIG. 3.

FIG. 4 is an exemplary circuit diagram of the frequency modulation unit as illustrated in FIG. 3. In FIG. 4, a circuit and method of doubling the period of the input clock signal IN using flip-flops is illustrated. Here, a power-up signal pwrup is a signal for sensing an input of an external power supply to the memory device and initializing internal circuits of the memory device when the external power is supplied to the memory device. Specifically, the power-up signal sets an initial level of the flip-flops.

In FIG. 4, the flip-flop 41 receives the clock signal IN and outputs the clock signal Up_clk having a period that is twice the period of the clock signal IN, and the the flip-flop 42 receives the clock signal IN and outputs the clock signal Down_clk having a period that is twice the period of the clock signal IN. As described above, the clock signal Up_clk rises in synchronization with the rising edge of the clock signal IN and falls in synchronization with the rising edge of the next clock signal, and the clock signal Down_clk rises in synchronization with the falling edge of the clock signal IN and falls in synchronization with the falling edge of the next clock signal IN. For reference, the flip-flop 42 receives an inversed signal of the clock signal IN.

The frequency modulation unit of FIG. 4 is provided as an example, and it will be apparent to those skilled in the art that different circuits for dividing the frequency by 2 can be used in place of the frequency modulation unit shown in FIG. 4.

Figure 5:
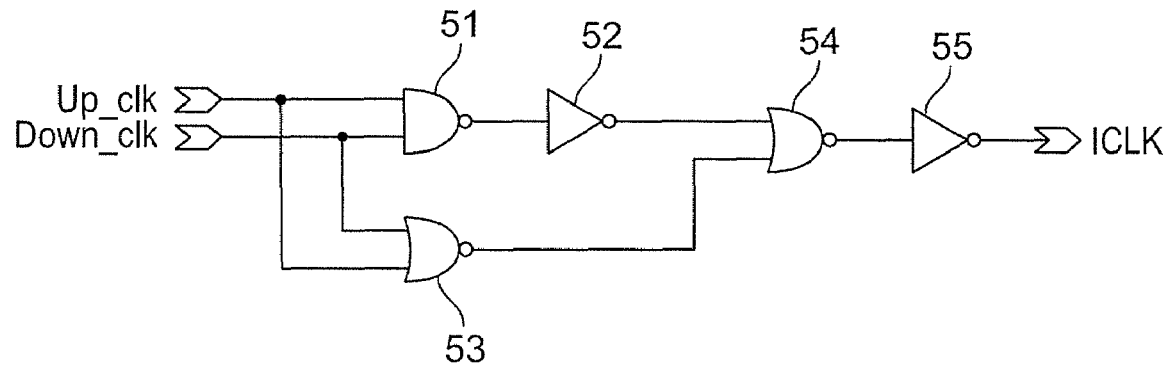
FIG. 5 is an exemplary circuit diagram of a clock generator as illustrated in FIG. 3.

FIG. 5 is a circuit diagram of an example of a clock generator illustrated in FIG. 3.

The clock generator of FIG. 5 includes a NAND gate 51 for receiving the clock signals Up_clk and Down_clk, an inverter 52 for receiving an output signal of the NAND gate 51, a NOR gate 53 for receiving the clock signals Up_clk and Down_clk, a NOR gate 54 for receiving an output signal of the inverter 52 and an output signal of the NOR gate 53, and an inverter 55 for receiving an output signal of the NOR gate 54. The inverter 55 outputs the internal clock signal ICLK.

Figure 6:
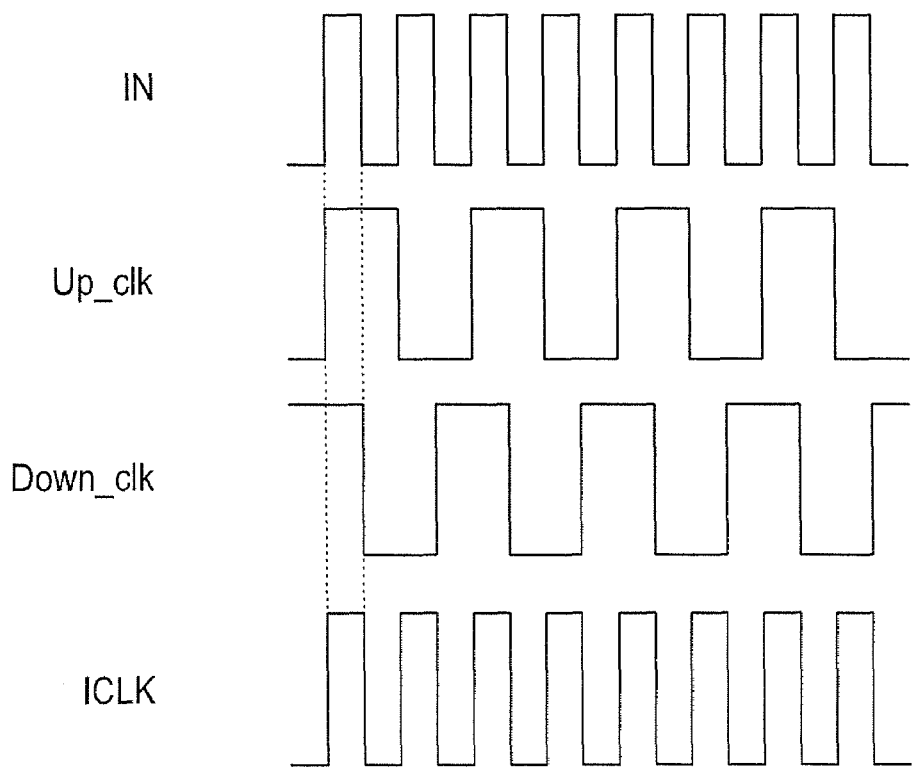
FIG. 6 is a waveform diagram illustrating clock signals IN, Up_clk, Down_clk and ICLK that appear in the circuits of FIGS. 3 to 5.

FIG. 6 is a waveform diagram illustrating clock signals IN, Up_clk, Down_clk and ICLK that appear in the circuits of FIGS. 3 to 5.

As can be seen in FIG. 6, the period of the clock signals Up_clk and Down_clk is twice the period of the clock signal IN, and the period of the internal clock signal ICLK is equal to the period of the clock signal IN.

Hereinafter, the operation of the internal clock generator according to the present invention that is advantageous in high-frequency operation will be explained in detail with reference to FIGS. 3 to 6.

The clock buffer 301 receives the external clock signal CLK of the SSTL level or the TTL level, and output the clock signal IN. Here, the low level of the clock signal IN corresponds to a ground voltage, and the high level thereof corresponds to a driving voltage VCC. That is, the clock signal IN is a clock signal that swings between the ground voltage and the driving voltage VCC. Here, the driving voltage VCC is for driving the clock buffer 301.

The frequency modulation unit 302 generates and transmits the clock signals Up_clk and Down_clk having the period that is twice the period of the clock signal IN to the clock generation units 35 to 38. In the case of doubling the period of the high-frequency clock signal IN as in the internal clock generator according to the present invention, a signal distortion is greatly reduced in comparison to the conventional clock generator. Particularly, if the loading of the transmission line is great, the signal distortion can properly be reduced by transmitting the low-frequency signal using the frequency modulation unit.

The clock generation units 35 to 38 receive the output signals of the frequency modulation unit 302, generate and provide the internal clock signal ICLK having the same frequency as the operating frequency of the memory device to the column control unit 31, the row control unit 32, etc.

In the present invention, the clock signals Up_clk and Down_clk having the lower frequency than the clock signal IN are generated and transferred to the clock generation units, and then the internal clock signal ICLK is generated. Here, it is preferable to make the transmission distance of the clock signals Up_clk and Down_clk, which reach the clock generation units, longer than the distance of the internal clock signal ICLK which reaches the column control units 31, etc. By doing so, the signal distortion which may occur during the transmission of the high-frequency signal can be prevented. As described above, the present invention can prevent the signal distortion occurring when the high-frequency signal is transmitted for a long distance through the transmission of the low-frequency signal instead of the high-frequency signal. Particularly, it may be possible that the clock signal transmission is performed using the same circuit as the conventional circuit if the internal transmission line is short, while the clock signal transmission is performed using the circuit proposed according to the present invention if the internal transmission line is long.

As described above, according to the present invention which is applicable to an ultrahigh-speed memory device, a stable internal clock signal can be generated by transmitting a low-frequency clock signal through a transmission line of a great loading and then generating an internal clock signal having the same frequency as an operating frequency using the transmitted low-frequency signal.

The present invention is not limited to this, but in the case in which the loading of the transmission line is extremely great, the clock signal having a frequency that is four times or more lower than the original clock signal may be generated and transmitted, and then the transmitted lower-frequency clock signal may be restored to the original clock signal.

In the case in which the internal clock generator according to the present invention is used, a stable internal clock can be generated even if the operating frequency is greatly high.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An internal clock generator comprising:
   a first internal clock signal generation circuit which receives a first internal clock signal having a first frequency and which uses the first internal clock signal to generate a second internal clock signal having a second frequency that is lower than the first frequency and which transmits the second internal clock signal;
   a second internal clock signal generation circuit, which receives the second internal clock signal transmitted from the first internal clock signal generating circuit and which uses the received second internal clock signal to generate a third internal clock signal having a frequency equal to the first frequency, the third internal clock signal being coupled to and controlling at least one of: a row control unit for a memory device and a column control unit for the memory device,
   wherein signal distortion is reduced by transmitting the second internal clock signal instead of transmitting the first internal clock signal,
   wherein the third internal clock signal is applied to the row control unit and the column control unit and controls an operating time point of the row control unit and the column control unit.

2. The internal clock generator as claimed in claim 1, wherein the first frequency is over 500 MHz.

3. The internal clock generator of claim 1, further comprised of a transmission line that extends between the first and second internal clock signal generation circuits.

4. The internal clock generator of claim 1, wherein the first internal clock signal generation circuit comprises flip-flops which use the first internal clock signal to generate the second internal clock signal.

5. The internal clock generator of claim 4, wherein a power-up signal sets an initial level of flip-flops.

6. A memory device comprising:
   a clock buffer which buffers an external clock signal into a first internal clock signal having a first frequency;
   a frequency modulation unit coupled to the clock buffer which receives the first internal clock signal from the clock buffer and which uses the first internal clock signal to generate second and third internal clock signals having second frequencies that is lower than the first frequency;
   a transmission line coupled to the frequency modulation unit which transmits the second and third internal clock signals; and
   a clock generation unit coupled to the transmission line which receives the transmitted second and third internal clock signals from the frequency modulation unit via the transmission line and which outputs a fourth internal clock signal to at least one of: a row control unit for the memory device and a column control unit for the memory device in which the fourth internal clock signal has a frequency equal to that of the first frequency,
   wherein signal distortion is reduced by transmitting the second and third internal clock signals instead of transmitting the first internal clock signal, and
   wherein the fourth internal clock signal is applied to the row control unit and the column control unit and controls an operating time point of the row control unit and the column control unit.

7. The memory device as claimed in claim 6, wherein the first frequency is $f_0$, and the second frequencies of the second and third internal clock signals are both $f_0/2$.

8. The memory device as claimed in claim 7, wherein the second internal clock signal rises in synchronization with a rising edge of the first internal clock signal and falls in synchronization with a next rising edge of the first internal clock signal, and the third internal clock signal rises in synchronization with a falling edge of the first internal clock signal and falls in synchronization with a next falling edge of the first internal clock signal.

9. The memory device as claimed in claim 8, wherein high-level sections of the second and third internal clock signals are equal to a period of the first internal clock signal.

10. The memory device as claimed in claim 6, wherein the first frequency is the same as a frequency of an external clock applied to a memory device.

11. The memory device as claimed in claim 6, wherein a transmission distance of the second and third internal clock signals that reach the clock generation unit is longer than a transmission distance of the fourth internal clock signal that reaches the row control unit and the column control unit.

* * * * *